United States Patent
Ebisawa et al.

(10) Patent No.: US 12,505,958 B2
(45) Date of Patent: Dec. 23, 2025

(54) SOLID ELECTROLYTIC CAPACITOR INCLUDING A VALVE METAL SUPPORT AND A CATHODE

(71) Applicant: TDK CORPORATION, Tokyo (JP)

(72) Inventors: Akira Ebisawa, Tokyo (JP); Hideyuki Kobayashi, Tokyo (JP); Takaaki Morita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 141 days.

(21) Appl. No.: 18/485,497

(22) Filed: Oct. 12, 2023

(65) Prior Publication Data

US 2024/0161984 A1 May 16, 2024

(30) Foreign Application Priority Data

Nov. 11, 2022 (JP) ................. 2022-181182

(51) Int. Cl.
| | | |
|---|---|---|
| *H01G 9/042* | (2006.01) | |
| *H01G 9/028* | (2006.01) | |
| *H01G 9/15* | (2006.01) | |
| *H01G 9/04* | (2006.01) | |

(52) U.S. Cl.
CPC ........... *H01G 9/0425* (2013.01); *H01G 9/028* (2013.01); *H01G 9/15* (2013.01); *H01G 2009/05* (2013.01)

(58) Field of Classification Search
CPC ......... H01G 9/028; H01G 9/15; H01G 9/0425
See application file for complete search history.

(56) References Cited

U.S. PATENT DOCUMENTS

| | | | | |
|---|---|---|---|---|
| 2003/0081373 A1* | 5/2003 | Hamada | .................. | H01G 9/15 361/502 |
| 2004/0264111 A1* | 12/2004 | Shimoyama | ........... | H01G 9/012 361/523 |
| 2005/0020060 A1* | 1/2005 | Aaltonen | ............... | H10D 1/692 438/650 |
| 2021/0166886 A1* | 6/2021 | Hong | ................... | H01G 9/0425 |

FOREIGN PATENT DOCUMENTS

| | | | |
|---|---|---|---|
| JP | 2001217159 A | * | 8/2001 |
| JP | 2008109070 A | * | 5/2008 |
| JP | 4677775 B2 | | 4/2011 |

* cited by examiner

*Primary Examiner* — David M Sinclair
(74) *Attorney, Agent, or Firm* — Oliff PLC (57) ABSTRACT

A solid electrolytic capacitor includes: a valve metal support having an anode terminal region and a cathode forming region and forming an anode part; and a cathode part provided in a cathode forming region of the valve metal support. The cathode part includes: a solid electrolyte layer that is disposed on a surface of a dielectric layer provided at least on the cathode forming region of the valve metal support and contains a conductive polymer; a waterproof seed layer that is disposed on a surface of the solid electrolyte layer and contains a conductive material; and a metal plating layer disposed on a surface of the waterproof seed layer. A catalytic metal having catalytic activity for plating is provided on the surface of the waterproof seed layer.

6 Claims, 4 Drawing Sheets

SOLID ELECTROLYTIC CAPACITOR INCLUDING A VALVE METAL SUPPORT AND A CATHODE

TECHNICAL FIELD

The present disclosure relates to a solid electrolytic capacitor.

BACKGROUND

One of conventional solid electrolytic capacitor disclosed in, for example, Japanese Patent No. 4677775 is known. A solid electrolytic capacitor described in Japanese Patent No. 4677775 includes a valve metal support forming an anode part having an anode terminal region and a cathode forming region, and a cathode part formed by laminating a solid electrolyte layer and a conductor layer on an oxide film provided on a surface of the cathode forming region of the valve metal support. The conductor layer includes a carbon paste layer and a silver paste layer.

SUMMARY

For example, in a case where a solid electrolytic capacitor is mounted on a vehicle or the like, high moisture resistance is required. Therefore, there is a demand for an improvement in moisture resistance of the solid electrolytic capacitor. In addition, there is a demand for a reduction in equivalent series resistance (ESR) of the solid electrolytic capacitors in order to improve characteristics.

One aspect of the present disclosure aims to provide a solid electrolytic capacitor capable of achieving an improvement in moisture resistance and a reduction in equivalent series resistance.

A solid electrolytic capacitor according to one aspect of the present disclosure includes: a valve metal support having an anode terminal region and a cathode forming region and forming an anode part; and a cathode part provided in the cathode forming region of the valve metal support. The cathode part includes: a solid electrolyte layer that is disposed on a surface of a dielectric layer provided at least on the cathode forming region of the valve metal support and contains a conductive polymer; an intermediate layer that is disposed on a surface of the solid electrolyte layer and contains a conductive material; and a metal plating layer disposed on a surface of the intermediate layer. A catalytic metal having catalytic activity for plating is provided on the surface of the intermediate layer.

In the solid electrolytic capacitor according to the one aspect of the present disclosure, the cathode part includes the solid electrolyte layer, the intermediate layer, and the metal plating layer disposed on the surface of the intermediate layer. The catalytic metal having the catalytic activity for plating is provided on the surface of the intermediate layer. As a result, the metal plating layer can be formed on a surface of the cathode part in the solid electrolytic capacitor. In addition, the intermediate layer having the metal plating layer formed on the surface thereof has water resistance to a plating solution. With such a configuration, the metal plating layer is formed on the outermost layer of the cathode part in the solid electrolytic capacitor. Therefore, moisture resistance can be improved in the solid electrolytic capacitor as compared with a case where the outermost layer of the cathode part is formed of a silver paste layer. In addition, the metal plating layer typically has lower equivalent series resistance than the silver paste layer. Therefore, the equivalent series resistance can be reduced in the solid electrolytic capacitor.

In one embodiment, the conductive material may be a carbon-based material, and the catalytic metal may be a palladium-based material. In this configuration, the conductivity can be imparted to the intermediate layer by containing the carbon-based material as the conductive material. In addition, the metal plating layer can be formed on the surface of the intermediate layer by containing the palladium-based material as the catalytic metal.

In one embodiment, the metal plating layer may be an electroless plating layer made of copper. A copper plating layer is excellent in conductivity. Therefore, the reduction in equivalent series resistance can be more reliably achieved.

In one embodiment, the intermediate layer contains at least a catalytic metal scavenger and carbon, and palladium may be formed on the surface on which the metal plating layer is formed. In this configuration, the conductivity can be imparted to the intermediate layer, and the metal plating layer can be formed on the surface of the intermediate layer.

In one embodiment, the intermediate layer may include a polypyrrole derivative as the catalytic metal scavenger. In this configuration, the metal plating layer can be more reliably formed on the surface of the intermediate layer.

In one embodiment, a thickness of the intermediate layer may be between 1 μm and 40 μm. In this configuration, the water resistance can be ensured in the intermediate layer. Therefore, the improvement in moisture resistance can be achieved in the solid electrolytic capacitor.

In one embodiment, the intermediate layer may include a waterproof conductive layer disposed on a side closer to the solid electrolyte layer, and a seed layer disposed on a side closer to the metal plating layer. In this configuration, the conductivity can be imparted to the intermediate layer, and the metal plating layer can be formed on the surface of the intermediate layer.

In one embodiment, the waterproof conductive layer may be thicker than the seed layer. In this configuration, the moisture resistance can be obtained more reliably.

In one embodiment, the thickness of the waterproof conductive layer may be 1 μm to 40 μm, and the thickness of the seed layer may be 1 nm to 100 nm. In this configuration, it is possible to ensure an electrical connection between the waterproof conductive layer and the metal plating layer while ensuring the moisture resistance.

According to one aspect of the present disclosure, it is possible to achieve the improvement in moisture resistance and the reduction in equivalent series resistance.

DETAILED DESCRIPTION

Hereinafter, preferred embodiments of the present invention will be described in detail with reference to the accompanying drawings. Note that the same or corresponding elements in the description of the drawings are denoted by the same reference signs, and redundant description is omitted.

Figure 1:
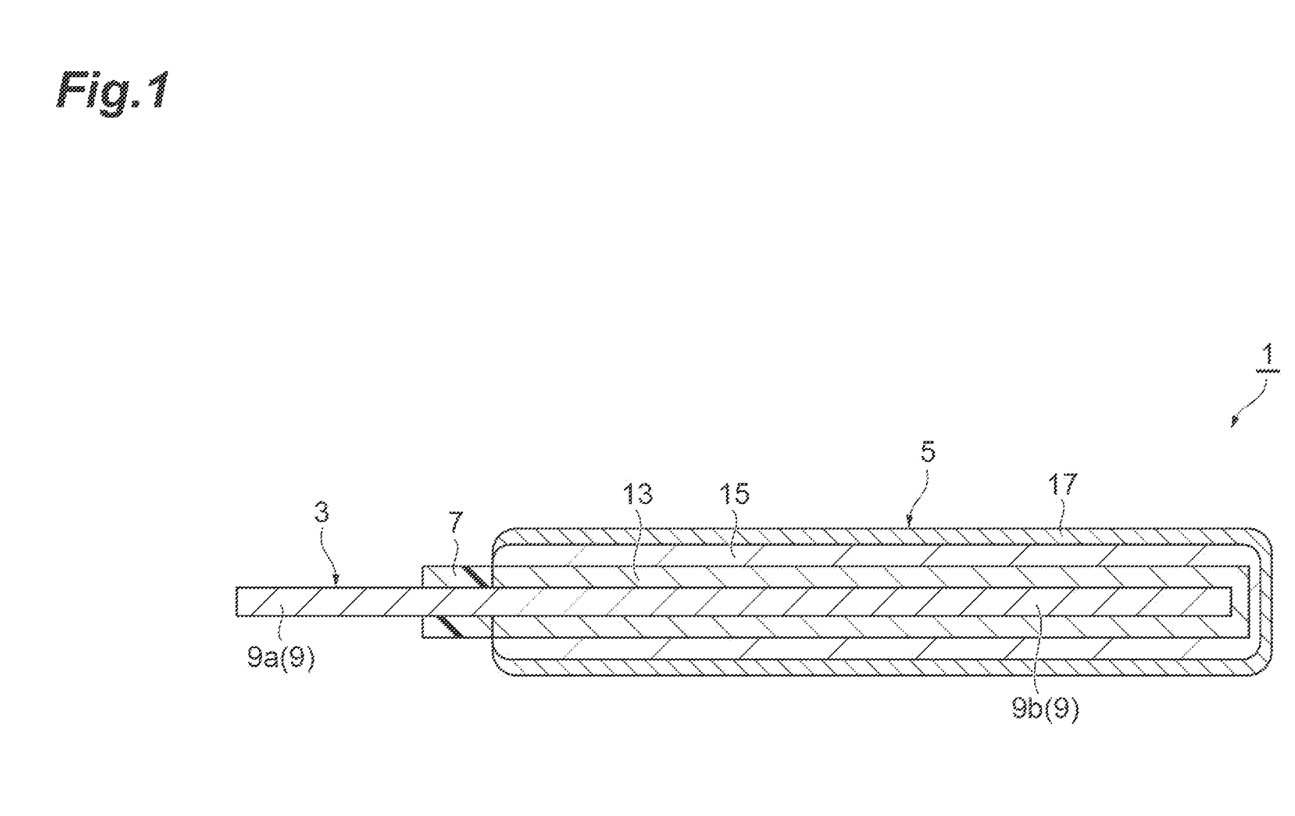
FIG. 1 is a cross-sectional view of a solid electrolytic capacitor according to one embodiment.
Figure 2:
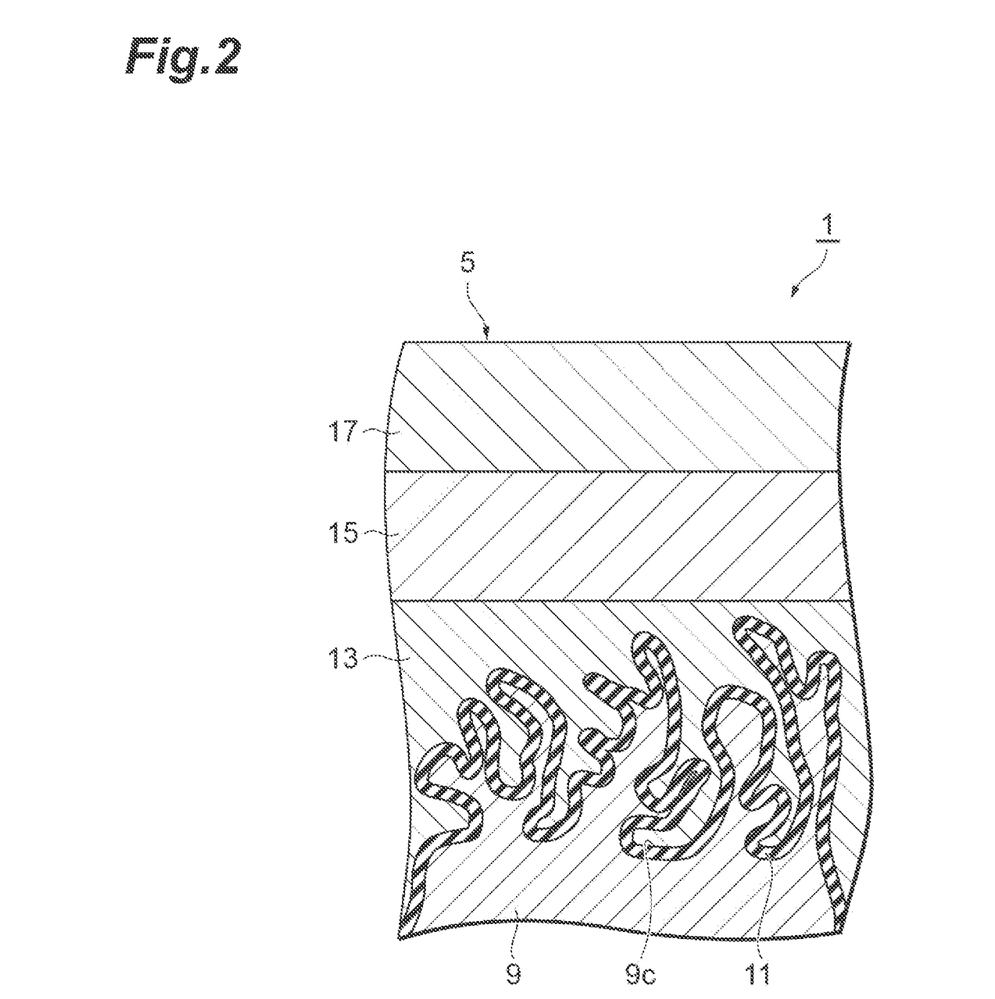
FIG. 2 is an enlarged cross-sectional view illustrating a partial structure of the solid electrolytic capacitor illustrated in FIG. 1 in detail.

FIG. 1 is a cross-sectional view of a solid electrolytic capacitor according to one embodiment; FIG. 2 is an enlarged cross-sectional view illustrating a partial structure of the solid electrolytic capacitor illustrated in FIG. 1 in detail. As illustrated in FIGS. 1 and 2, a solid electrolytic capacitor 1 includes an anode part 3, a cathode part 5, and an insulating part 7.

The anode part 3 includes a valve metal support 9. As illustrated in FIG. 2, a surface of the valve metal support 9 is subjected to roughening (chemical conversion) to form a fine uneven shape. A material forming the valve metal support 9 is not particularly limited as long as it is generally used for electrolytic capacitors, and examples thereof include so-called valve action metals such as aluminum, tantalum, niobium, titanium, hafnium, zirconium, zinc, tungsten, bismuth, and antimony. Among them, aluminum or tantalum is relatively preferably used. The valve metal support 9 made of these valve action metals is also called a valve action metal layer. A thickness of the valve metal support 9 is, for example, about 1 μm to 500 μm.

The valve metal support 9 has an anode terminal region 9a and a cathode forming region 9b. The anode terminal region 9a is a region that functions as a terminal of the anode part 3. The cathode forming region 9b is a region where the cathode part 5 is formed.

As illustrated in FIG. 2, a dielectric layer 11 is formed on a surface of the cathode forming region 9b of the valve metal support 9. The dielectric layer 11 is typically a metal oxide film (for example, an aluminum oxide film when the valve metal support 9 is aluminum) having an electrical insulation property. The dielectric layer 11 is formed by oxidizing a surface layer part of the valve metal support 9 by a predetermined method. A thickness of the dielectric layer 11 is, for example, about 1 nm to 1 μm.

The cathode part 5 includes a solid electrolyte layer 13, a waterproof seed layer (intermediate layer) 15, and a metal plating layer 17. The cathode part 5 is provided on a surface (an upper surface, a lower surface, and a side surface) of the cathode forming region 9b of the valve metal support 9. The cathode part 5 is formed by laminating the solid electrolyte layer 13, the waterproof seed layer 15, and the metal plating layer 17 on the dielectric layer 11. Specifically, in the cathode part 5, the solid electrolyte layer 13, the waterproof seed layer 15, and the metal plating layer 17 are laminated in this order from the dielectric layer 11 side.

The solid electrolyte layer 13 is formed along the dielectric layer 11 on a fine uneven surface of the valve metal support 9 formed by surface expansion so as to fill a recess 9c. A thickness of the solid electrolyte layer 13 is preferably set to such a thickness that can cover the uneven surface. The thickness of the solid electrolyte layer 13 is, for example, about 1 μm to 100 μm.

The solid electrolyte layer 13 contains at least a conductive polymer compound. As the conductive polymer compound, one that is typically used can be used, and for example, polypyrrole, polyaniline, polythiophene, and polyfuran, and derivatives thereof can be used, and poly(3,4-ethylenedioxythiophene) (PEDOT) and polypyrrole (ppy) are preferably used. One of these may be used alone, or two or more kinds thereof may be mixed and used.

The waterproof seed layer 15 is formed on a surface of the solid electrolyte layer 13. Specifically, the waterproof seed layer 15 is formed on a surface of the solid electrolyte layer 13 opposite to a surface of the solid electrolyte layer 13 in contact with the dielectric layer 11. The waterproof seed layer 15 has waterproofness (plating resistance) and conductivity, and also has a function as a seed layer for electroless plating. The waterproof seed layer 15 contains at least a resin, a conductive material, and a catalytic metal, and preferably contains a catalytic metal scavenger. The catalytic metal scavenger and the catalytic metal are seed materials. A thickness of the waterproof seed layer 15 is, for example, about 1 μm to 40 μm.

As the resin, a phenol resin, a urea resin, an epoxy resin, or the like can be used. As the conductive material, carbon (a carbon-based material), graphite, metal, or the like can be used, and carbon is particularly preferably used. As the catalytic metal scavenger, for example, polypyrrole, polyaniline, polyamine, polythiophene, and polyfuran, and various derivatives thereof can be used, and polypyrrole is particularly preferably used. These derivatives can efficiently form a plating layer by trapping the catalytic metal by the coordinate bond and reducing the catalytic metal again.

The catalytic metal is a noble metal having catalytic activity for electroless plating. As the catalytic metal, palladium (a palladium-based material), gold, platinum, rhodium, or the like can be used, and palladium is particularly preferably used. One of these may be used alone, or two or more kinds thereof may be mixed and used.

The catalytic metal is provided on a surface of the waterproof seed layer 15. Specifically, the catalytic metal is provided on a surface of the waterproof seed layer 15 opposite to a surface in contact with solid electrolyte layer 13. The catalytic metal is held by being coordinated (coordinate-bonded) to the catalytic metal scavenger on the surface of the waterproof seed layer 15 (the surface on which the metal plating layer 17 is formed). In this case, a waterproof seed layer not containing the catalytic metal is formed, and then, is impregnated with a solution containing the catalytic metal, whereby the catalytic metal can be held only on the surface. Note that the catalytic metal may be provided (included) in a portion other than the surface of the waterproof seed layer 15.

The metal plating layer 17 is formed on the surface of the waterproof seed layer 15. Specifically, the metal plating layer 17 is formed on a surface of the waterproof seed layer 15 opposite to a surface of the waterproof seed layer 15 in contact with the solid electrolyte layer 13. The metal plating layer 17 is an electroless plating layer formed by electroless plating. As metal forming the metal plating layer 17, copper, nickel, tin, or the like can be used, and copper is particularly preferably used. One of these may be used alone, or two or more kinds thereof may be mixed and used.

As illustrated in FIG. 1, the insulating part 7 is formed on a surface (an upper surface, a lower surface, and a side surface) of a boundary portion between the anode terminal region 9a and the cathode forming region 9b in the valve metal support 9. In addition to a function of electrically insulating the anode part 3 and the cathode part 5, the insulating part 7 also has a function of preventing a solution from creeping up in an immersion process such as a conductive polymer polymerization process or a paste coating process. A width of the insulating part 7 is, for example, 0.1 mm to 1.0 mm A thickness of the insulating part 7 is, for example, 1 μm to 50 μm, and preferably 5 μm to 40 μm.

The insulating part 7 may be constituted by two resist parts. For example, the insulating part 7 may include a first resist part formed on the surface of the valve metal support 9 so as to divide the anode terminal region 9a and the cathode forming region 9b of the valve metal support 9, and a second resist part continuously formed across a surface of the first resist part on a side closer to the anode terminal region 9a and the surface of the valve metal support 9. The first resist part and the second resist part are formed so as to extend in a width direction of the valve metal support 9 from one side surface toward the other side surface of the solid electrolytic capacitor 1. That is, the second resist part is entirely formed in an extending direction of the first resist part with respect to the first resist part. The first resist part is made of a resin having hydrophilicity, for example, an epoxy resin. The second resist part is made of a resin having hydrophobicity (water repellency), for example, a silicon resin or a fluororesin.

Subsequently, a method for manufacturing the solid electrolytic capacitor 1 will be described. First, the valve metal support 9 whose surface has been subjected to roughening and chemical conversion is prepared, and the valve metal support 9 is machined (punched) into a predetermined shape by a mold.

Subsequently, the insulating part 7 is formed on the surface of the boundary portion between the anode terminal region 9a and the cathode forming region 9b in the valve metal support 9 subjected to the chemical conversion using a printing method, a dispenser, an inkjet method, a transfer method, or the like. Subsequently, the dielectric layer 11 is formed on a surface (cut surface) of an edge portion of the valve metal support 9 exposed by the above-described die punching.

Subsequently, the solid electrolyte layer 13 is formed on the surface of the cathode forming region 9b of the valve metal support 9 by, for example, an electrolytic polymerization method, a chemical oxidation polymerization method, or the like. Specifically, the cathode forming region 9b of the valve metal support 9 is immersed in a polymerization solution in a polymerization tank to perform electrolytic polymerization and chemical oxidation polymerization, thereby forming the solid electrolyte layer 13.

Subsequently, the waterproof seed layer 15 is formed on the solid electrolyte layer 13 by a screen printing method, an immersion method, a spray coating method, or the like. Next, the metal plating layer 17 is formed on the waterproof seed layer 15 using an electroless plating method. As a result, the cathode part 5 is formed. As described above, the solid electrolytic capacitor 1 is obtained.

Figure 3:
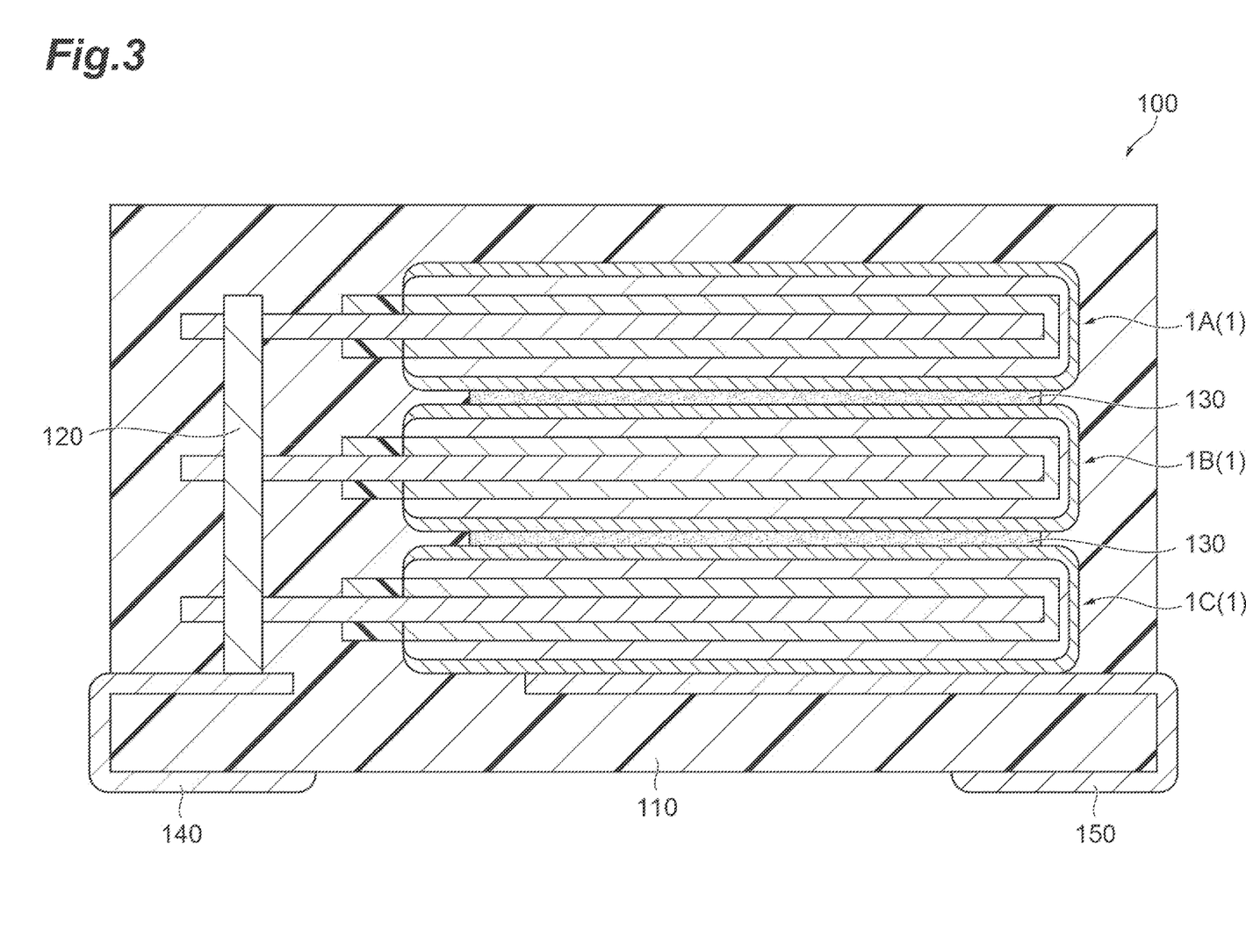
FIG. 3 is a cross-sectional view of a capacitor structure.

FIG. 3 is a cross-sectional view of a capacitor structure. As illustrated in FIG. 3, a capacitor structure 100 includes a plurality of the solid electrolytic capacitors 1. The capacitor structure 100 includes the plurality of solid electrolytic capacitors 1, a mold part 110, a connection part 120, and adhesion parts 130. In the present embodiment, the capacitor structure 100 includes three solid electrolytic capacitors 1. In the following description, for convenience of description, the three solid electrolytic capacitors 1 may be distinguished from each other using a solid electrolytic capacitor 1A, a solid electrolytic capacitor 1B, and a solid electrolytic capacitor 1C.

The mold part 110 molds the plurality of solid electrolytic capacitors 1. The mold part 110 forms an exterior of the capacitor structure 100. The mold part 110 is made of an insulating resin material such as an epoxy resin. The mold part 110 includes a first terminal electrode 140 and a second terminal electrode 150. The first terminal electrode 140 and the second terminal electrode 150 are portions mounted on a circuit board or the like.

The connection part 120 is made of a material having conductivity. The connection part 120 electrically connects the anode parts 3 of the plurality of solid electrolytic capacitors 1A to 1C. The connection part 120 is, for example, welding or caulking. One end (lower end) of the connection part 120 is connected to the first terminal electrode 140. As a result, the anode parts 3 of the solid electrolytic capacitors 1A to 1C are electrically connected to the first terminal electrode 140. Note that the anode parts 3 of the solid electrolytic capacitors 1A to 1C may be electrically connected to the first terminal electrode 140 by directly connecting (disposing) the anode part 3 of the solid electrolytic capacitor 1C to the first terminal electrode 140.

The adhesion parts 130 cause the adjacent solid electrolytic capacitors 1A to 1C to adhere to each other. The adhesion part 130 is a conductive adhesive. The adhesion parts 130 electrically connect (joins) the cathode parts 5 of the adjacent solid electrolytic capacitors 1A to 1C. Specifically, the adhesion part 130 joins the cathode part 5 of the solid electrolytic capacitor 1A and the cathode part 5 of the solid electrolytic capacitor 1B. In addition, the adhesion part 130 joins the cathode part 5 of the solid electrolytic capacitor 1B and the cathode part of the solid electrolytic capacitor 1C. A part of the cathode part of the solid electrolytic capacitor 1C is disposed on the second terminal electrode 150. With these configurations, the cathode parts 5 of the solid electrolytic capacitors 1A to 1C are electrically connected to the second terminal electrode 150.

As described above, in the solid electrolytic capacitor 1 according to the present embodiment, the cathode part 5 includes the solid electrolyte layer 13, the waterproof seed layer 15, and the metal plating layer 17 disposed on the surface of the waterproof seed layer 15. The catalytic metal having the catalytic activity for plating is provided on the surface of the waterproof seed layer 15. As a result, the metal plating layer 17 can be formed on the surface of the cathode part 5 in the solid electrolytic capacitor 1. In addition, the waterproof seed layer having the metal plating layer 17 formed on the surface thereof has water resistance (plating resistance) to a plating solution. With such a configuration, the metal plating layer 17 is formed on the outermost layer of the cathode part 5 in the solid electrolytic capacitor 1. Therefore, the moisture resistance can be improved in the solid electrolytic capacitor 1 as compared with a case where the outermost layer of the cathode part 5 is formed of a silver paste layer. In addition, the metal plating layer 17 typically has lower equivalent series resistance than the silver paste layer. Therefore, the equivalent series resistance can be reduced in the solid electrolytic capacitor 1.

In the solid electrolytic capacitor 1 according to the present embodiment, the conductive material included in the waterproof seed layer 15 is a carbon-based material, and the catalytic metal included in the waterproof seed layer 15 is a palladium-based material. In this configuration, the conductivity can be imparted to the waterproof seed layer 15 by containing the carbon-based material as the conductive material. In addition, the metal plating layer 17 can be formed on the surface of the waterproof seed layer 15 by containing the palladium-based material as the catalytic metal.

In the solid electrolytic capacitor 1 according to the present embodiment, the metal plating layer 17 is the electroless plating layer containing copper. A copper plating layer is excellent in conductivity. Therefore, the reduction in equivalent series resistance can be more reliably achieved.

In the solid electrolytic capacitor 1 according to the present embodiment, the waterproof seed layer 15 contains at least a polypyrrole derivative and carbon, and palladium is formed on the surface on which the metal plating layer 17 is formed. In this configuration, the conductivity can be imparted to the waterproof seed layer 15, and the metal plating layer 17 can be more reliably formed on the surface of the waterproof seed layer 15.

In the solid electrolytic capacitor 1 according to the present embodiment, the thickness of the waterproof seed layer 15 is 1 μm to 40 μm. In this configuration, the water resistance can be ensured in the waterproof seed layer 15. Therefore, the improvement in moisture resistance can be achieved in the solid electrolytic capacitor 1.

Although the embodiment of the present invention has been described above, the present invention is not necessarily limited to the above-described embodiment, and various modifications can be made without departing from the gist thereof.

Figure 4:
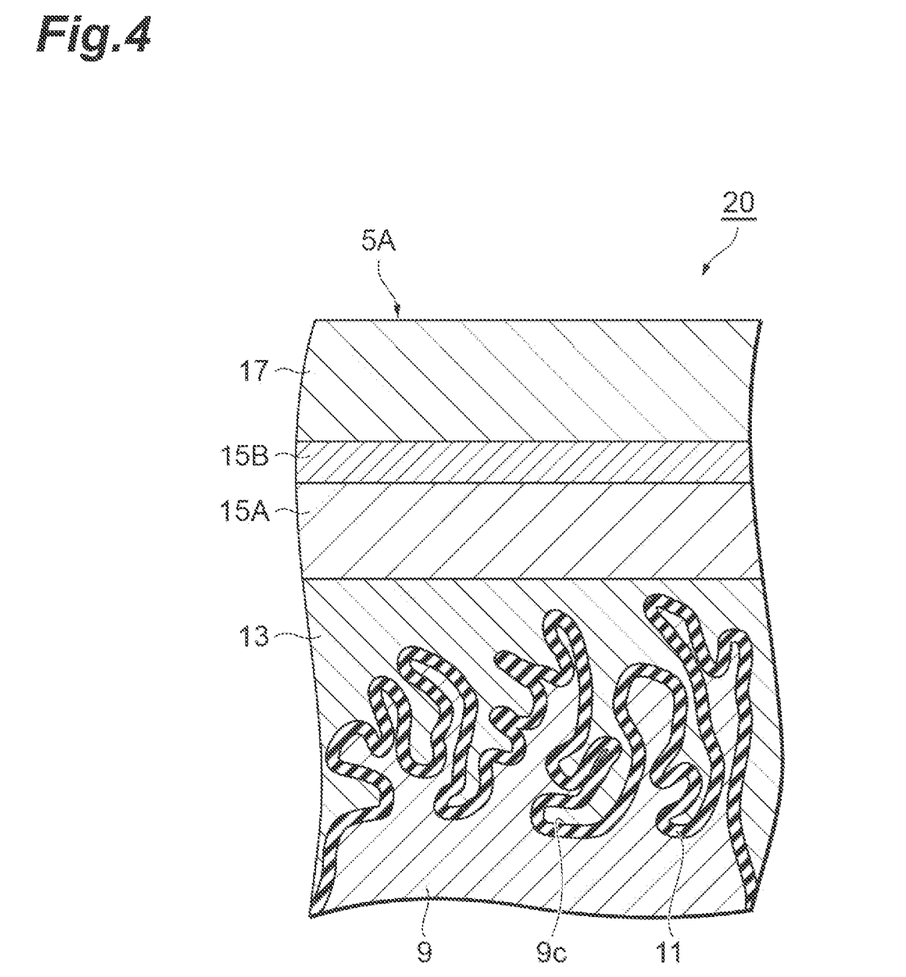
FIG. 4 is an enlarged cross-sectional view illustrating a partial structure of a solid electrolytic capacitor according to another embodiment in detail.

In the above embodiment, a mode in which the waterproof seed layer 15 as an intermediate layer has waterproofness (plating resistance) and conductivity, and also has the function as the seed layer for electroless plating has been described as an example. However, the intermediate layer may include a plurality of layers. FIG. 4 is an enlarged cross-sectional view illustrating a partial structure of a solid electrolytic capacitor according to another embodiment in detail. As illustrated in FIG. 4, a cathode part 5A of a solid electrolytic capacitor includes a waterproof conductive layer 15A and a seed layer 15B between the solid electrolyte layer 13 and the metal plating layer 17. The waterproof conductive layer 15A and the seed layer 15B constitute an intermediate layer. The waterproof conductive layer 15A is disposed on a side closer to the solid electrolyte layer 13. The seed layer 15B is disposed on a side closer to the metal plating layer 17.

The waterproof conductive layer 15A is formed on a surface of the solid electrolyte layer 13. The waterproof conductive layer 15A is formed on a surface of the solid electrolyte layer 13 opposite to a surface of the solid electrolyte layer 13 in contact with the dielectric layer 11. The waterproof conductive layer 15A has waterproofness (plating resistance) and conductivity. The waterproof conductive layer 15A contains a resin and a conductive material. A thickness of the waterproof conductive layer 15A is, for example, about 1 μm to 40 μm.

The seed layer 15B is formed on a surface of the waterproof conductive layer 15A. Specifically, the seed layer 15B is formed on a surface of the waterproof conductive layer 15A opposite to a surface of the waterproof conductive layer 15A in contact with the dielectric layer 11. The seed layer 15B contains a resin component and a catalytic metal. Note that the seed layer 15B may contain a conductive polymer material. A thickness of the seed layer 15B is, for example, about 1 nm to 100 nm. The thickness of the seed layer 15B is thinner than the thickness of the waterproof conductive layer 15A. In other words, the thickness of the waterproof conductive layer 15A is thicker than the thickness of the seed layer 15B. In this configuration, it is possible to ensure an electrical connection between the waterproof conductive layer 15A and the metal plating layer 17 while ensuring moisture resistance.

Note that the intermediate layer is not limited to two layers of the waterproof conductive layer 15A and the seed layer 15B, and may further include another layer. For example, the waterproof conductive layer may include two or more layers.

Also in the solid electrolytic capacitor 20, the outermost layer of the cathode part 5A is formed of the metal plating layer 17. Therefore, an improvement in moisture resistance and a reduction in equivalent series resistance can be achieved in the solid electrolytic capacitor 20 as compared with a case where the outermost layer of the cathode part 5A is formed of a silver paste layer.

In the above embodiment, a mode in which the metal plating layer 17 is formed by the electroless plating method has been described as an example. However, the metal plating layer 17 may be formed by another plating method.

In the above embodiment, a mode in which the capacitor structure 100 includes the three solid electrolytic capacitors 1 has been described as an example. However, the capacitor structure 100 may include two solid electrolytic capacitors 1, or may include four or more solid electrolytic capacitors 1.

EXAMPLES

Hereinafter, the present invention will be described more specifically based on Examples and Comparative Examples, but the present invention is not limited to the following Examples.

(Example 1) An electrolytic capacitor was manufactured through the following procedure. First, an aluminum foil subjected to surface expansion was prepared as an anode, and an insulator for dividing a portion to be an anode (anode terminal region) and a portion to be a cathode (cathode forming region) on a surface of the aluminum foil was formed at a position where these portions need to be divided. The aluminum foil was immersed in an aqueous solution of ammonium adipate as a chemical conversion solution, and then, a voltage was applied to the aluminum foil to cause anodic oxidation reaction to progress, thereby forming a dielectric layer including an aluminum oxide film on a surface layer of the aluminum foil. As a result, a valve metal support having the dielectric layer formed on the aluminum foil was obtained.

Next, the valve metal support was coated with PEDOT to form a solid electrolyte layer on the valve metal support. Next, a waterproof seed layer was formed on the solid electrolyte layer. As the waterproof seed layer, the waterproof seed layer 1 shown in Table 1 was formed. The waterproof seed layer 1 contains a phenol resin/urea resin as a resin, contains ethylene glycol monobutyl ether/isobutyl acetate as a solvent, contains graphite/carbon black as a conductive material, and contains ppy/Pd as a seed material. The waterproof seed layer was formed to be 20 μm.

Next, a metal plating layer was formed on the waterproof seed layer. The metal plating layer was immersed in an electroless plating bath to form copper plating. A solid electrolytic capacitor was obtained as described above.

TABLE 1

| | | Waterproof seed layer 1 | Waterproof seed layer 2 |
|---|---|---|---|
| Composition | Resin | phenol resin/urea resin | epoxy resin |
| | Solvent | ethelene glycol monobutyl ether/ isobutyl acetate | ethylene glycol monobutyl ether/ isobutyl acetate |
| | Conductive material | graphite/carbon black | graphite/carbon black |
| | Seed material | ppy/Pd | ppy/Pd |

(Example 2) A solid electrolytic capacitor of Example 2 was produced in the same manner as in Example 1 except that the following waterproof seed layer 2 was used as a waterproof seed layer.

As shown in Table 1, the waterproof seed layer 2 contains an epoxy resin as a resin, contains ethylene glycol monobutyl ether/isobutyl acetate as a solvent, contains graphite/carbon black as a conductive material, and contains ppy/Pd as a seed material. The waterproof seed layer was formed to be 20 μm.

(Example 3) A solid electrolytic capacitor of Example 3 was produced in the same manner as in Example 1 except that the following ppy was used as a conductive polymer.

An electrolytic polymerization method was used to form ppy on a valve metal support, and a solid electrolyte layer was formed on the valve metal support. Specifically, a conductive polymer to serve as a seed polymer was formed on the valve metal support by applying PEDOT. Subsequently, the conductive polymer was immersed in a polymerization solution containing a pyrrole monomer and a doping material, and the seed polymer was energized to form a ppy electrolytic polymerization film. Next, a washing step of washing a surface of the valve metal support with flowing water and drying the surface was performed. As a result, the solid electrolyte layer was formed on a dielectric layer of the support.

(Example 4) A solid electrolytic capacitor of Example 4 was produced in the same manner as in Example 3 except that the following waterproof seed layer 2 was used as a waterproof seed layer.

(Comparative Example 1) A solid electrolytic capacitor of Comparative Example 1 was produced in the same manner as in Example 1 except that the following waterproof seed layer was used as a waterproof seed layer.

The waterproof seed layer was a Pd mixed film. The Pd mixed film contains a binder resin and Pd. The Pd mixed film does not contain ppy. The Pd mixed film was formed to be 50 nm.

(Comparative Example 2) A solid electrolytic capacitor of Comparative Example 2 was produced in the same manner as in Example 1 except that the following waterproof seed layer was used as a waterproof seed layer.

The waterproof seed layer was a ppy mixed film. The ppy mixed film contains a binder resin and Pd. In formation of the waterproof seed layer, Pd was added to the ppy mixed film. The ppy mixed film was formed to be 25 nm.

(Evaluation of Solid electrolytic capacitor) Evaluation of plating appearance, measurement of ESR, and a peeling test were performed on the solid electrolytic capacitors obtained in Examples 1 to 4 and Comparative Examples 1 and 2. In plating appearance inspection, the solid electrolytic capacitors obtained in Examples 1 to 4 and Comparative Examples 1 and 2 were evaluated as "○" in a case where the metal plating layer was formed on the entire surface including ends, "Δ" in a case where the metal plating layer was not formed on the ends, and "x" in a case where no metal plating layer was formed or in a case where a defect (such as swelling) occurred in the metal plating layer.

In the measurement of ESR, ESR at 100 kHz was acquired using an LCR meter, and a comparison was made.

In the peeling test, in the solid electrolytic capacitors obtained in Examples 1 to 4 and Comparative Examples 1 and 2, a cellophane tape was attached to one surface of the metal plating layer at the cathode part, and then, the cellophane tape was peeled off at a constant speed. As a result, "○" was marked in a case where there was no plating component adhering to the cellophane tape, that is, in a case where the metal plating layer was not peeled off, and "x" was marked in a case where there was a plating component adhering to the cellophane tape, that is, in a case where at least a part of the metal plating was peeled off.

TABLE 2

|  |  | Example 1 | Example 2 | Example 3 | Example 4 | Comparative Example 1 | Comparative Example 2 |
|---|---|---|---|---|---|---|---|
| Conductive polymer | | PEDOT (coating) | PEDOT (coating) | ppy (electrolytic polymerization) | ppy (electrolytic polymerization) | PEDOT (coating) | PEDOT (coating) |
| Waterproof seed layer | Kind | Waterproof seed layer 1 | Waterproof seed layer 2 | Waterproof seed layer 1 | Waterproof seed layer 2 | Pd mixed film | ppy mixed film |
| | Thickness | 20 um | 20 um | 20 um | 20 um | 50 nm | 25 nm |
| Characteristics | Plating appearance | Δ | ○ | ○ | ○ | X | X |
| | ESR | 200 mΩ | 90 mΩ | 130 mΩ | 60 mΩ | — | 2 Ω |
| | Peeling test | ○ | ○ | ○ | ○ | — | — |

As shown in Table 2, it was confirmed that "Δ" or "○" was marked for the plating appearance in the solid electrolytic capacitors of Examples 1 to 4. It was confirmed that "x" was marked for the plating appearance in both the solid electrolytic capacitors of Comparative Examples 1 and 2. It was confirmed that ESR was 60 mΩ to 200 mΩ in the solid electrolytic capacitors of Examples 1 to 4. In the solid electrolytic capacitor of Comparative Example 1, it was not possible to measure ESR. It was confirmed that 2Ω was measured in the solid electrolytic capacitor of Comparative Example 2. In the solid electrolytic capacitors of Comparative Examples 1 and 2, peeling occurred between some layers from the valve metal support to the metal plating layer. This is presumed to be affected by the plating solution due to an insufficient waterproof function. The solid electrolytic capacitors of Examples 1 to 4 were confirmed to have lower ESR than that of the solid electrolytic capacitor of Comparative Example 2. It was confirmed that "○" was marked for the peeling test in all of the solid electrolytic capacitors of Examples 1 to 4.

(Example 5) An electrolytic capacitor was manufactured through the following procedure. First, an aluminum foil subjected to surface expansion was prepared as an anode, and an insulator for dividing a portion to be an anode (anode terminal region) and a portion to be a cathode (cathode forming region) on a surface of the aluminum foil was formed at a position where these portions need to be divided. The aluminum foil was immersed in an aqueous solution of ammonium adipate as a chemical conversion solution, and then, a voltage was applied to the aluminum foil to cause anodic oxidation reaction to progress, thereby forming a dielectric layer including an aluminum oxide film on a surface layer of the aluminum foil. As a result, a valve metal support having the dielectric layer formed on the aluminum foil was obtained.

Next, the valve metal support was coated with PEDOT to form a solid electrolyte layer on the valve metal support. Next, a waterproof conductive layer was formed on the solid electrolyte layer. As the waterproof conductive layer, Waterproof conductive layer 1 shown in Table 3 was formed. Waterproof conductive layer 1 contains a phenol resin/urea resin as a resin, contains ethylene glycol monobutyl ether/isobutyl acetate as a solvent, and contains graphite/carbon black as a conductive material. The waterproof conductive layer was formed to be 20 um.

Next, a seed layer was formed on the waterproof conductive layer. As the seed layer, Seed layer 1 was formed. As shown in Table 4, Seed layer 1 contains a phenol resin/urea resin as a resin, contains ethylene glycol monobutyl ether/isobutyl acetate as a solvent, and contains ppy/Pd as a seed material. The seed layer was formed to be 20 nm.

Next, a metal plating layer was formed on the seed layer. The metal plating layer was immersed in an electroless plating bath to form copper plating. A solid electrolytic capacitor was obtained as described above.

TABLE 3

| | | Waterproof conductive layer 1 | Waterproof conductive layer 2 |
|---|---|---|---|
| Composition | Resin | phenol resin/urea resin | epoxy resin |
| | Solvent | ethylene glycol monobutyl ether/isobutyl acetate | ethylene glycol monobutyl ether/isobutyl acetate |
| | Conductive material | graphite/carbon black | graphite/carbon black |

TABLE 4

| | | Seed layer 1 | Seed layer 2 |
|---|---|---|---|
| Composition | Resin | phenol resin/urea resin | epoxy resin |
| | Solvent | ethylene glycol monobutyl ether/isobutyl acetate | ethylene glycol monobutyl ether/isobutyl acetate |
| | Seed material | ppy/Pd | ppy/Pd |

(Example 6) A solid electrolytic capacitor of Example 6 was produced in the same manner as in Example 5 except that Waterproof conductive layer 2 shown in Table 3 was used as a waterproof conductive layer, and Seed layer 2 shown in Table 4 was used as a seed layer. Seed layer 2 contains an epoxy resin as a resin, contains ethylene glycol monobutyl ether/isobutyl acetate as a solvent, and contains ppy/Pd as a seed material.

(Example 7) A solid electrolytic capacitor of Example 7 was produced in the same manner as in Example 5 except that a Pd mixed film was used as a seed layer.

(Example 8) A solid electrolytic capacitor of Example 8 was produced in the same manner as in Example 6 except that a Pd mixed film was used as a seed layer.

(Example 9) A solid electrolytic capacitor of Example 9 was produced in the same manner as in Example 5 except that a ppy mixed film was used as a seed layer. The seed layer was formed to be 25 nm.

(Example 10) A solid electrolytic capacitor of Example 10 was produced in the same manner as in Example 9 except that the following ppy was used as a conductive polymer.

(Comparative Example 3) A solid electrolytic capacitor of Comparative Example 3 was obtained by forming a Pd mixed film as a seed layer on a solid electrolytic layer without forming a waterproof conductive layer.

(Comparative Example 4) A solid electrolytic capacitor of Comparative Example 4 was obtained by forming a ppy mixed film as a seed layer on a solid electrolytic layer without forming a waterproof conductive layer.

TABLE 5

| | | Example 5 | Example 6 | Example 7 | Example 8 | Example 9 | Example 10 | Comparative Example 3 | Comparative Example 4 |
|---|---|---|---|---|---|---|---|---|---|
| Conductive polymer | | PEDOT (coating) | PEDOT (coating) | PEDOT (coating) | PEDOT (coating) | PEDOT (coating) | ppy (electrolytic polymerization) | PEDOT (coating) | PEDOT (coating) |
| Waterproof conductive layer | Kind | Waterproof conductive layer 1 | Waterproof conductive layer 2 | Waterproof conductive layer 1 | Waterproof conductive layer 2 | Waterproof conductive layer 1 | Waterproof conductive layer 1 | — | — |
| | Thickness | 20 um | 20 um | 20 um | 20 um | 20 um | 20 um | — | — |
| Seed layer | Kind | Seed layer 1 | Seed layer 2 | Pd mixed film | Pd mixed film | ppy mixed film | ppy mixed film | Pd mixed film | ppy mixed film |
| | Thickness | 20 um | 20 um | 20 nm | 20 nm | 25 nm | 25 nm | 50 nm | 25 nm |
| Characteristics | Plating appearance | ○ | ○ | ○ | ○ | ○ | ○ | X | X |
| | ESR | 120 mΩ | 110 mΩ | 90 mΩ | 80 mΩ | 100 mΩ | 60 mΩ | — | 2 Ω |
| | Peeling test | ○ | ○ | ○ | ○ | ○ | ○ | — | — |

(Evaluation of Solid Electrolytic Capacitor) As shown in Table 5, it was confirmed that "○" was marked for the plating appearance in all of the solid electrolytic capacitors of Examples 5 to 10. It was confirmed that "x" was marked for the plating appearance in both Comparative Examples 3 and 4. It was confirmed that ESR was 60 mΩ to 120 mΩ in the solid electrolytic capacitors of Examples 5 to 10. In the solid electrolytic capacitor of Comparative Example 3, it was not possible to measure ESR. It was confirmed that 2Ω was measured in the solid electrolytic capacitor of Comparative Example 4. The solid electrolytic capacitors of Examples 5 to 10 were confirmed to have lower ESR than that of the solid electrolytic capacitor of Comparative Example 4. It was confirmed that "○" was marked for the peeling test in all of the solid electrolytic capacitors of Examples 5 to 10.

As described above, the improvement in moisture resistance and the reduction in equivalent series resistance can be achieved according to the solid electrolytic capacitor of the present invention.

What is claimed is:

1. A solid electrolytic capacitor comprising:
    a valve metal support having (i) an anode terminal region that functions as an anode part, and (ii) a cathode forming region; and
    a cathode part provided in the cathode forming region of the valve metal support,
    wherein the cathode part includes:
        a dielectric layer provided at least on the cathode forming region of the valve metal support;
        a solid electrolyte layer that is disposed on a surface of the dielectric layer and contains a conductive polymer;
        an intermediate layer that is disposed on a surface of the solid electrolyte layer and contains (i) a catalytic metal trapping material that includes a polypyrrole derivative; (ii) a carbon-based conductive material; and (iii) a palladium-based material having catalytic activity for plating; and
        a metal plating layer disposed on a surface of the intermediate layer,
    wherein the palladium-based material is present on a surface where the metal plating layer is disposed, and the polypyrrole derivative traps palladium by coordinate bonding to facilitate forming the metal plating layer by reducing the palladium.

2. The solid electrolytic capacitor according to claim 1, wherein the metal plating layer is an electroless plating layer containing copper.

3. The solid electrolytic capacitor according to claim 1, wherein the intermediate layer has a thickness of 1 μm to 40 μm.

4. The solid electrolytic capacitor according to claim 1, wherein the intermediate layer includes a waterproof conductive layer disposed on a side closer to the solid electrolyte layer, and a seed layer disposed on a side closer to the metal plating layer.

5. The solid electrolytic capacitor according to claim 4, wherein the waterproof conductive layer is thicker than the seed layer.

6. The solid electrolytic capacitor according to claim 5, wherein
    the waterproof conductive layer has a thickness of 1 μm to 40 μm, and
    the seed layer has a thickness of 1 nm to 100 nm.

* * * * *